July 25, 1967    G. K. C. HARDESTY    3,332,161
ILLUMINATED FIXED INDICIA INDICATING DEVICE
Original Filed Dec. 7, 1960

INVENTOR.
G. K. C. HARDESTY
BY
*Howard W. Hermann*
AGENT.

3,332,161
ILLUMINATED FIXED INDICIA INDICATING DEVICE
George K. C. Hardesty, Box 156, Mayo, Md. 21106
Original application Dec. 7, 1960, Ser. No. 74,438, now Patent No. 3,264,769, dated Aug. 9, 1966. Divided and this application Nov. 30, 1965, Ser. No. 523,478
3 Claims. (Cl. 40—130)

ABSTRACT OF THE DISCLOSURE

An illuminated signalling indicator comprising a plurality of indicia bearing edge-illuminated transparent elements mounted to cooperate with a light input element of light conducting material assembled immediately behind it and having sources of light within its boundaries. An opaque element which preferably has a dark face for viewing by the observer and a light reflective face adjacent the lamp is assembled between the light input element and the signal bearing elements and extends to shield their adjacent faces from each other except at their peripheral boundaries. Light reflective surfaces are provided at the peripheries of the elements to couple the elements optically whereby indicia can be alternatively illuminated.

---

The invention described herein may be manufactured and used by or for the Government of the United States of America for governmental purposes without the payment of any royalties thereon or therefor.

The present application is a divisional application of applicant's co-pending application Ser. No. 74,438, filed Dec. 7, 1960, now Patent 3,264,769 issued Aug. 9, 1966.

The present invention relates to panel illumination and more particularly to the illumination of control console indicators under conditions running from near or total darkness to high ambient illumination.

Many critical equipment failures or other emergency conditions can result from the complexities of modern aircraft, shipboard, and missile control equipment. To protect the ship or aircraft or missile and the personnel who must work around it continuous monitoring and alarm systems have been progressively developed. Several types of these monitoring and alarm systems employ audible signals to attract attention of personnel but in some instances there is difficulty in providing distinctively different audible signals for each of the monitors. In other instances, as in the submarine, audible signals must be silent for long periods and reliance placed on silent warning signals. Available visual signals however, do not cover the necessary range of application needs. There is little available to the ship or aircraft designer between the "pilot" or "indicator light" and the large rotating flashing signals of the familiar police squad car or ambulance. Conspicuous, attention demanding, legend displays, which are compact and inexpensive, are needed to provide many shipboard and shore installations with adequate monitor warning signal systems.

Many types of indicator lights and panel illumination devices have been suggested for use on control consoles. The failure of many existing indicator displays to be discernible in high ambient illumination has been the cause of much concern in both shipboard and aircraft situations. When a number of conventional indicator lights are grouped together, the total array is too bright for comfort for near-dark adaptation viewing. Further, the full significance of the light being energized is often a matter of training and memory because it has not been possible heretofore to read the legends on nearby nameplates with prevalent ambient illumination. Some dim-out cap assemblies utilize back-lighted, stencilled, legend discs but their use entails a sharp reduction of maximum brightness that depreciates the effectiveness of the signal, particularly in the higher ambient illumination now prevalent in new submarine construction. Translucent signal panels have in the past been rear illuminated by lamps placed behind the panel. However, such attempts at rear illumination invariably have resulted in uneven ineffective illumination if the lamps are placed close to the rear panels, or vastly reduced brightness if the lamps are sufficiently removed from the panels to result in reasonably uniform brightness. It should also be noted that in some instances, sufficient space is not available behind the console panel for removal of these lamps in case of lamp failure.

The present invention permits efficient, presentation of displays which are particularly suitable for use in high ambient illumination conditions. The underlying optical system is capable of use with various types of illumination sources with greater efficiency in both power and space than was possible with most prior art devices. The illumination provided by this invention achieves uniform high brightness displays that are suitable for use in control and monitoring applications where the uneven, ineffective, displays which were prevalent in many prior art devices are virtually useless. These advantages are provided basically by a closed-loop or reentrant optical circuit wherein the light source is shielded from the indicia to be illuminated by an opaque barrier. In accordance with the invention, light from the light source is carried around the opaque shield, in accordance with the laws of total internal reflection, by a transparent light transmitting element.

Accordingly, it is an object of the present invention to provide an improved illuminated signal device adequate for use under conditions of high ambient illumination as well as under conditions of near or total darkness.

Another object is the provision of a system for effecting local zones of rear illumination in translucent signal panels with the result that uniform brightness symbols on the panels may be selectively illuminated in accordance with the needs of a monitoring or control equipment.

A further object of the invention is to provide, a small illuminated-legend, indicating module capable of presenting information without the need for auxiliary name plate interpretation.

Still another object is the provision of a legend display which will be conspicuous, attention demanding, compact, inexpensive, and optionally capable of presenting the displayed information in a series of coded colors.

Other objects and many of the attendant advantages of this invention will be readily appreciated as the same becomes better understood by reference to the following detailed description when considered in connection with the accompanying drawings wherein.

Figure 1:
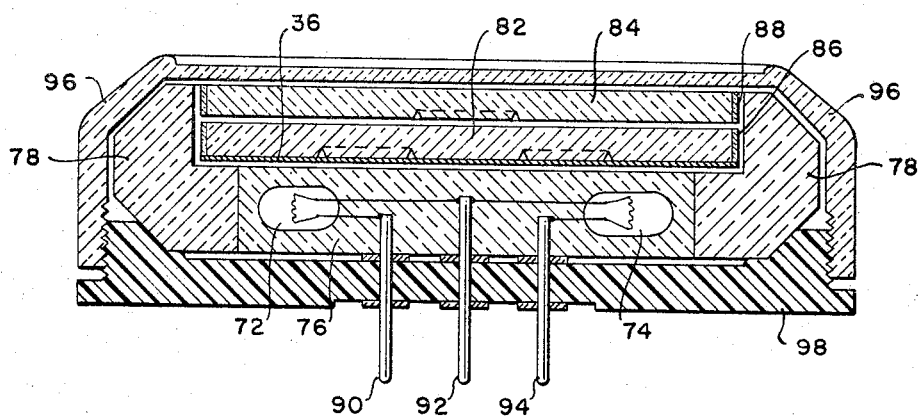
FIG. 1 is an embodiment of the invention utilizing encapsulated lamps for a multi-colored display.
Figure 2:
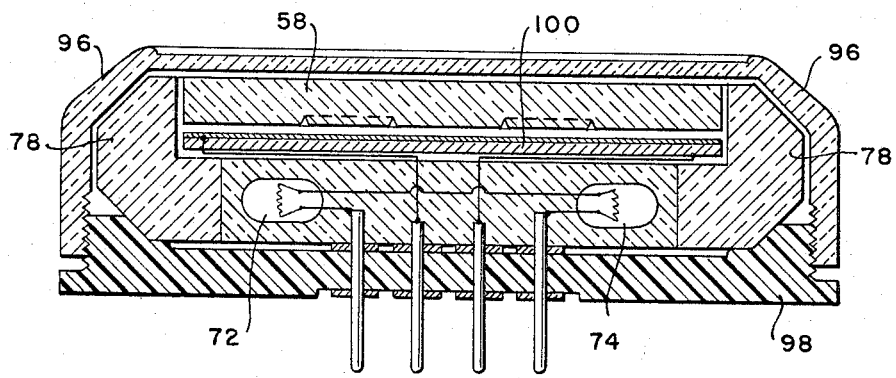
FIG. 2 is a sectional view of an embodiment similar to FIG. 1 wherein an electro-luminescent lamp is utilized in cooperation with the encapsulated lamps.

Referring now to FIGS. 1 and 2 there are shown two embodiments of circular, plug-in, indicator modules. The embodiment shown in FIG. 1 utilizes lamps of two different colors which are designed to cooperate selectively with two legend display elements. The module of FIG. 1 comprises a pair of light sources 72, 74, each having its periphery coated with a colored dye or colored filter material; the two light sources each having a different color. Light sources 72, 74 are encapsulated directly or by means of a transparent gel or highly viscous fluid in a clear light transmitting element 76 which is mounted for cooperation with a light carrying element 78, having reflective beveled edges for transmitting light from sources 72, 74 to a pair of indicia bearing edgelighted display elements 82 and 84. Inner element 82 has an opaque light barrier 36 assembled adjacent to its back face and has a colored filter 86 fitted around its periphery. Upper indicia display element 84 also has a color filter 88 around its periphery. Each of the filters 86, 88 is of a color which will absorb the light flux emitted from only one of said lamps 72 or 74. Thus if lamp 72 is colored red, lamp 74 is colored blue, indicia panel filter 86 is colored red, and indicia panel filter 88 is colored blue, when lamp 74 is energized by placing a voltage source across prongs 92 and 94, indicia panel 84 will be illuminated in blue but the red filtered panel 82 will absorb the blue light which is incident on its peripheral filter and its indicia will not become luminous. Conversely, when lamp 72 is illuminated, indicia panel 82 will be illuminated in red to the exclusion of the indicia panel 84. By selectively energizing prongs 90 and 94 a selected indicia in the selected color will be illuminated. The assembly is housed in a combined bezel, body, and viewing window 96 which may be threaded onto a support portion 98 and plugged into the control panel by the prongs 90, 92 and 94.

The embodiment shown in FIG. 2 is similar to the embodiment shown in FIG. 1 with the exception that the lamps 72 and 74 are designed to be of the same color and a single edge lighted display element 58 is utilized to display indicia. In addition to lamps 72, 74, there is provided an electroluminescent panel 100 which is designed to provide a directly lighted field behind element 58 against which the indicia will be silhouetted for low ambient viewing. It further serves as a light barrier to eliminate any direct lighting of indicia element 58, by lamp sources 72 and 74. Additionally, the electroluminescent lamp forms a visual background for the high luminence level edge lighted symbols of the display element 58 when lamps 72 and 74 are energized instead of the electroluminescent lamp. Thus, the electroluminescent lamp may be utilized to display the total area of the viewing window or alternatively may be used to display merely a masked off portion forming an alternate symbol to be viewed under conditions of low ambient illumination.

Obviously many other modifications and variations of the present invention are possible in the light of the above teachings. It is therefore to be understood that within the scope of the appended claims the invention may be practiced otherwise than as specifically described.

I claim:

1. An indicator illuminations system comprising a light source, means providing first and second indicia to be illuminated, an opaque light shield interposed between said light source and said indicia to prohibit direct lighting of said indicia by said light source, means providing a reentrant light conducting circuit extending from said light source to said indicia whereby light entering said circuit from said light source is conducted through said circuit to illuminate said indicia and is recirculated through said circuit to enhance the illumination, said reentrant light conducting circuit means comprising a first light conducting panel into which light from said light source is injected, and second and third light conducting panels for carrying illumination to said first and second indicia, respectively, said second panel being in front of said third panel and cooperating with said first light conducting panel to receive light therefrom, said first light conducting panel having a first pair of light reflective facets being connected between said first light conducting panel and said second light conducting panel and a second pair of light reflective facets being connected between said first light conducting panel and said third light conducting panel adapted to carry light around said opaque light shield, said light source comprising first and second incandescent bulbs and first and second filters surrounding said first and second incandescent bulbs, respectively, said first and second filters each being of a different color, a third filter placed between said first and second panels in the path of light, said third filter being transparent to light from only one of said first and second incandescent bulbs, and a fourth filter placed between said first panel and said third panel in the path of light, said fourth filter being transparent to light from only the other of said first and second incandescent bulbs, whereby energization of said one of said first and second bulbs will effect illumination of said first indicia to the exclusion of said second indicia and energization of said other of said first and second incandescent bulbs will effect illumination of said second indicia to the exclusion of said first indicia.

2. A multiple-state indicator comprising a common plural color state alternate light source, means providing first and second indicia to be illuminated, first and second color-filter means interposed between said light source and said indicia to prohibit illumination of one of said indicia by one color of light from said light source and the second indicia by another color of light from said light source, means providing a reentrant light conducting circuit extending from said light source to both said first and second indicia means whereby light entering said circuit from said light source is conducted through said circuit to illuminate said indicia and a substantial portion of the light not directed from the circuit by the indicia is recirculated through said circuit to enhance and provide uniformity of illumination, said reentrant light conducting circuit means comprising a first light conducting panel into which light from said plural color state light source is injected, and light conducting means for carrying illumination to said first and second indicia, respectively, light circuit means connecting said first light conducting panel to said light conducting means, whereby energization of said source to one of its color states will effect illumination of said first indicia to the exclusion of said second indicia and energization of said source to an alternate color state will effect illumination of said second indicia to the exclusion of said first indicia.

3. A multiple state indicator according to claim 2 in which the first and second indicia comprise different graphic symbols on second and third edge-illuminated panels and an opaque barrier being interposed between said light source and said second and third edge-illuminated light conducting panels to prevent direct silhouette illumination of said indicia.

References Cited

UNITED STATES PATENTS

| 2,916,011 | 12/1959 | Molis | 116—129 |
| 2,945,313 | 7/1960 | Hardesty | 40—130 |
| 2,953,668 | 9/1960 | Bassett | 40—130 X |
| 3,131,670 | 5/1964 | Hardesty | 40—130 X |

FOREIGN PATENTS

| 816,795 | 5/1937 | France. |

LAWRENCE CHARLES, *Primary Examiner.*